United States Patent [19]
Raimondi

[11] 3,743,367
[45] July 3, 1973

[54] JOURNAL BEARING

[75] Inventor: Albert A. Raimondi, Monroeville, Pa.

[73] Assignee: Westinghouse Electric Corporation, Pittsburgh, Pa.

[22] Filed: Oct. 8, 1971

[21] Appl. No.: 187,774

[52] U.S. Cl. .............................................. 308/122
[51] Int. Cl. ............................................ F16c 33/66
[58] Field of Search ................. 308/9, 122, 96, 97

[56] References Cited
FOREIGN PATENTS OR APPLICATIONS
781,085  8/1957  Great Britain........................ 308/76

Primary Examiner—Charles J. Myhre
Assistant Examiner—Frank Susko
Attorney—A. T. Stratton, F. P. Lyle and F. J. Baehr, Jr.

[57] ABSTRACT

A horizontally split journal bearing having a plurality of ducts underlying a babbitted bearing surface in the lower half of the bearing, and the ducts have oil flowing therethrough to remove heat from the bearing surface.

8 Claims, 6 Drawing Figures

JOURNAL BEARING

BACKGROUND OF THE INVENTION

This invention relates to journal bearings and more particularly to large journal bearings for a turbine.

With the increased demand for electrical power, steam and gas turbines are becoming larger and require larger bearings, which result in high friction losses, instability and high operating temperatures. The friction losses, which are directly proportional to the axial length of the bearings, can be minimized by providing a short bearing, that is, a bearing, which has a ratio of length to diameter (L/D) which is small. Such a bearing also has the characteristics of being more stable than longer bearings of the same diameter. However, bearings with small L/D ratios operate at higher temperatures than bearings with larger L/D ratios.

SUMMARY OF THE INVENTION

In general, a journal bearing for supporting a rotating shaft, when made in accordance with this invention, comprises a base portion and a cap portion, the base portion having a bearing surface subtending the shaft and a plurality of ducts subtending the bearing surface. The cap portion has a device for supplying pressurized lubricating oil to the bearing surface and to the ducts to support the shaft on a wedge shaped film of oil and to cause the oil to flow through the ducts and remove heat from the bearing surface.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
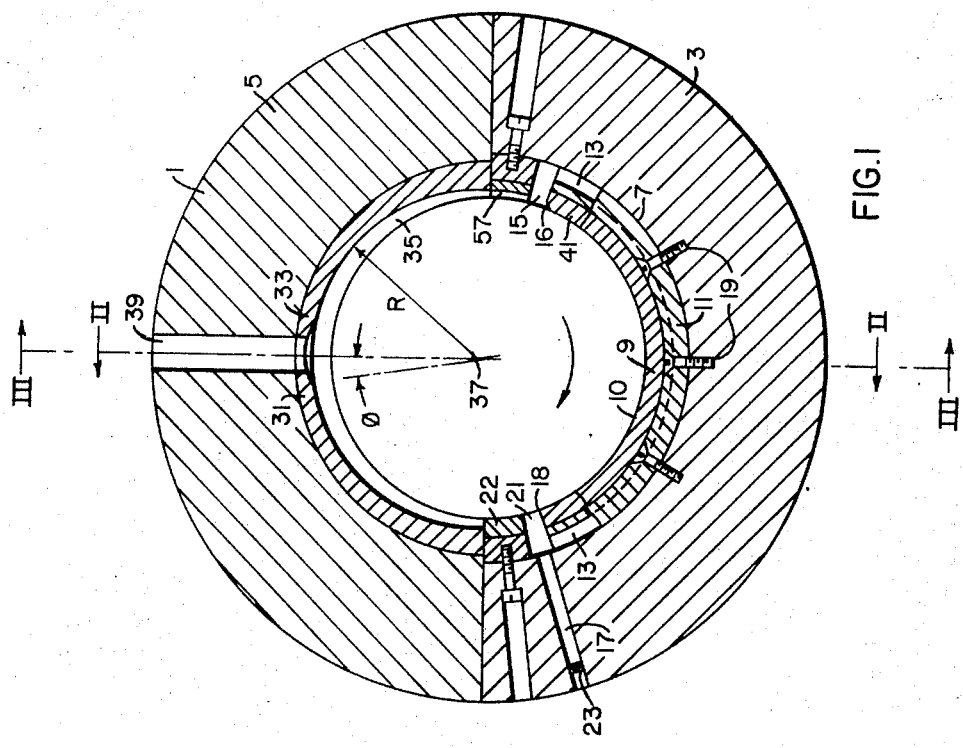
FIG. 1 is a vertical sectional view of the journal bearing made in accordance with this invention.

Referring now to the drawings in detail, FIG. 1 shows a horizontally split journal bearing 1 for supporting a clockwise rotatable shaft having a journal portion disposed thereon (not shown). The bearing 1 comprises a lower or base portion 3 and an upper or cap portion 5. The base portion 3 has a semicircular bore 7 extensively larger than the diameter of the shaft. The bore 7 is lined with a pair of arcuate liners, a babbitt liner 9, which subtends the journal portion of the shaft and provides the main bearing surface 10, and an underlying liner 11, which subtends the babbitt liner 9 and has a plurality of arcuate ducts 13 disposed therein. The ducts 13 extend from an inlet slot 15 disposed adjacent the leading edge 16 of the babbitt liner 9 to a discharge port 17 disposed adjacent the trailing edge 18 of the babbitt liner 9. The underlying liner 11 is preferably copper or some other highly thermally conductive material and is fastened to the base portion 3 by machine screws 19 or other means. The babbitt liner 9 is cast on the underlying liner 11. An axial slot 21 adjacent the trailing edge 18 of the babbitt liner 9 is in communication with the discharge port 17 and forms a dam 22 for wiping lubricating fluid from the shaft as it rotates in a clockwise direction. An orifice 23 is disposed adjacent the port 17 to regulate the quantity of lubricating fluid flowing through the ducts 13.

The upper portion 5 of the bearing 1 has a semicircular axial bore 31 extensively larger than the diameter of the shaft. The bores 7 and 31 are generally concentric but the bore 7 in the base 3 is generally larger than the bore 31 in the cap 5. An arcuate babbitt liner 33 is cast in the bore 31 and has a radius slightly larger than the radius of the shaft. The liner 33 also has a cylindrical groove 35 having a radius R which is larger than the radius of the liner 33. The axis 37 of the groove 35 is disposed in a plane passing through the axis of the bearing 1 and the plane forms an angle $\phi$ with a vertical plane passing through the axis of the bearing. An inlet port 39 is disposed in the upper portion 5 and is in communication with a supply of pressurized lubricating fluid or oil (not shown) and with the groove 35. The groove 35 is adapted to cooperate with the shaft to form a pump to increase the pressure of the pressurized lubricating fluid as it flows from the inlet port to the inlet slot 15 prior to entering the ducts 13.

The inlet slot 15 extends axially and has a bevel edge 41 so disposed that a film of lubricating fluid remaining on the shaft forms a wedge shape film between the shaft and the main bearing surface 10 to support the shaft and prevent metal to metal contact between the shaft and the bearing surface 10 as the shaft rotates.

Figure 6:
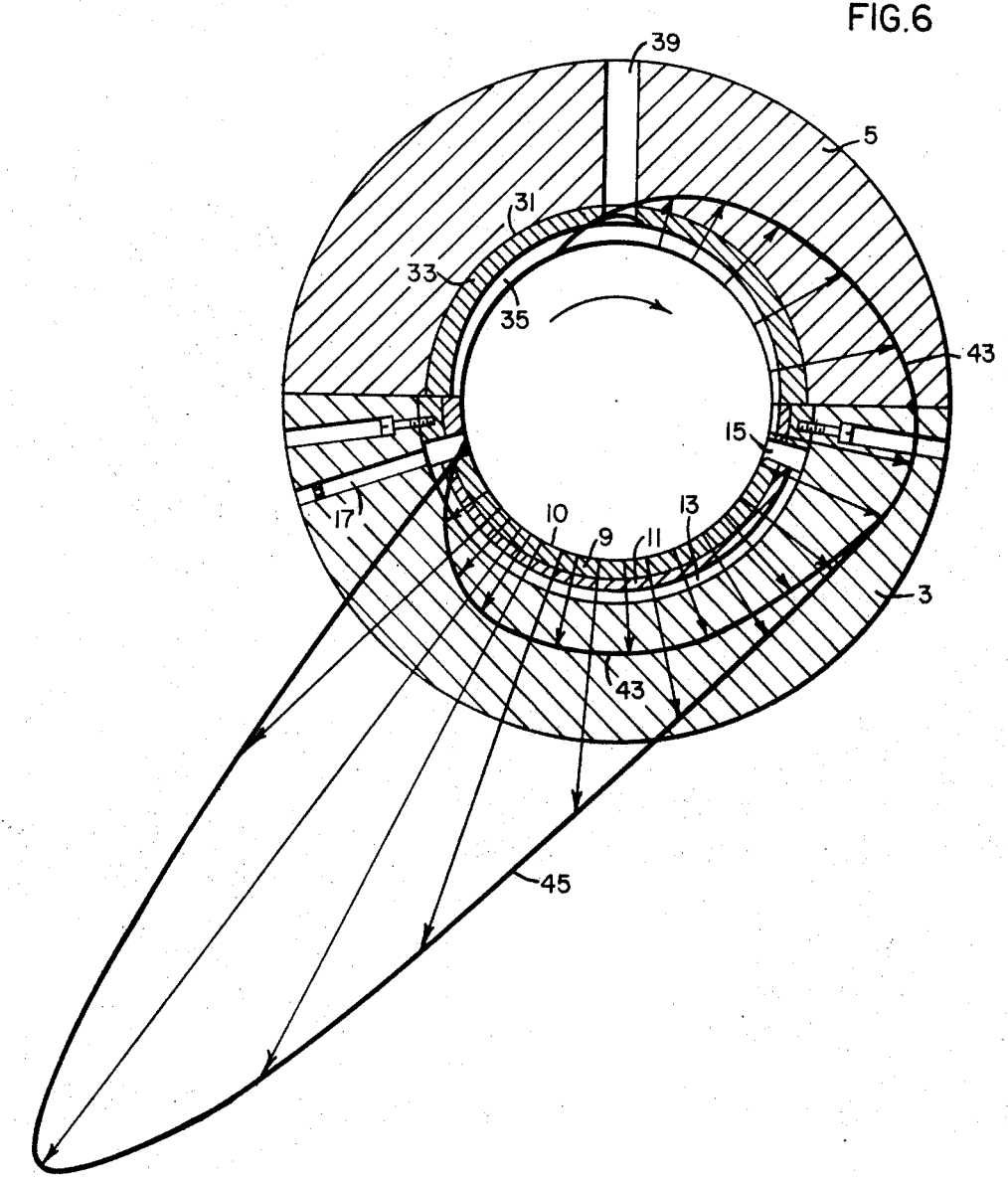
FIG. 6 is a sectional view similar to FIG. 1 showing the pressure distribution of the lubricating and cooling oil.

FIG. 6 shows the distribution of the pressure of the lubricating fluid superimposed on a sectional view of the bearing 1. Line 43 represents the value of the pressure of the lubricating fluid as it flows from the inlet port 39 and through the ducts 13 to the discharge port 17. Line 45 represents the value of the pressure of the lubricating film across the main bearing surface 10. The arrows indicate the direction of the pressure and its magnitude. Increasing the pressure of the fluid supplied to the inlet slot 15 results in a proportional increase in flow of lubricating fluid through the ducts 13 to remove additional heat from the bearing surface 10.

Figure 2:
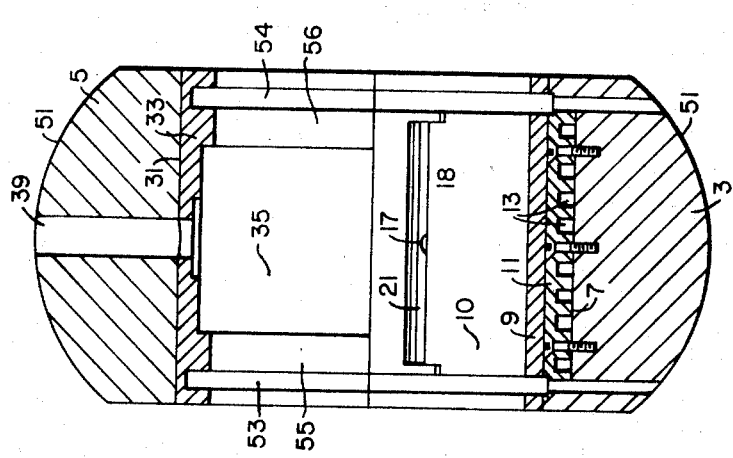
FIG. 2 is a sectional view taken on line II—II of FIG. 1.

As shown in FIGS. 1 and 2 the bearing 1 has a spherical outer surface 51 and a pair of circumferential grooves 53 and 54 in the babbitt liners 9 and 33. The grooves 53 and 54 are disposed adjacent the axial ends of the bearing and are adapted to return lubricating fluid to the supply and prevent it from running out the ends of the bearing.

The groove 35 is disposed in-board of the grooves 53 and 54, there being lands 55 and 56 disposed there-between. The lands 55 and 56 serve as seals, which prevent large quantities of lubricating fluid from flowing from groove 35 to grooves 53 and 54, when the shaft is rotating.

The inlet slot 15 and axial slot 21 extend axially and stop short of the grooves 53 and 54.

Figure 3:
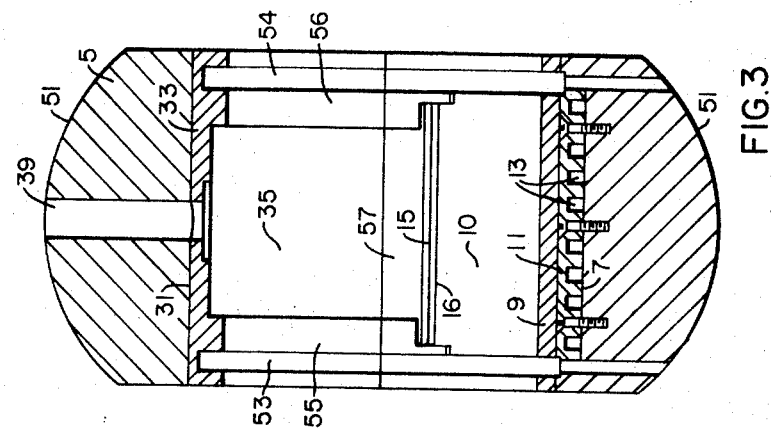
FIG. 3 is a sectional view taken on line III—III of FIG. 1.

As shown in FIG. 3 the babbitt liner 9 in the base portion 3 extends beyond the inlet slot 15 and has a groove 57 which registers with the groove 35 to direct the pressurized lubricating fluid to the inlet slot 15 and to the leading edge 16 of the bearing surface 10. The portions of the base which contain the dam 22 and the groove 57 are separately fastened to the base portion 3 to facilitate machining and to provide end closures for the ducts 13.

Figure 4:
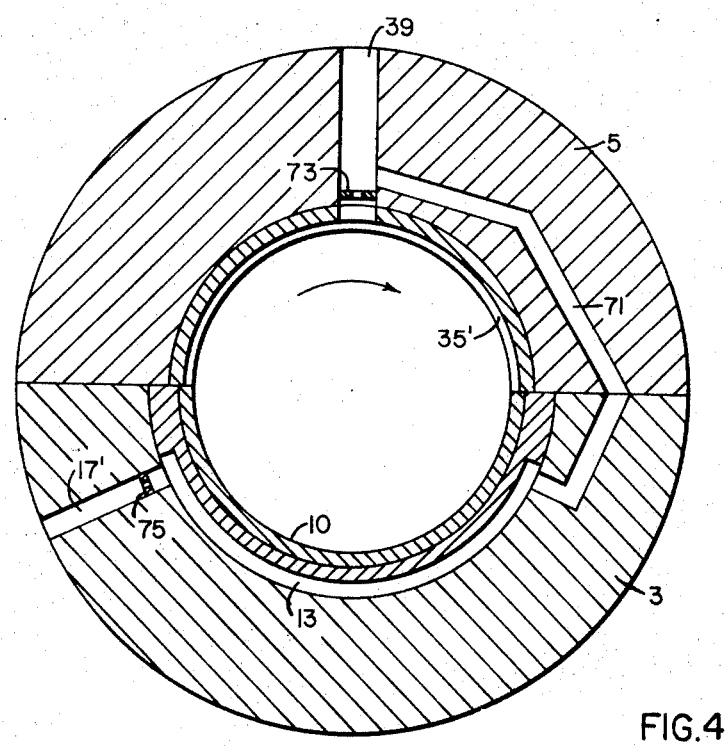
FIG. 4 is a sectional view similar to FIG. 1 showing a modification.

FIG. 4 shows a modification on in which a cap portion 5 has an inlet port 39 and a groove 35', and a base portion 3 has a bearing surface 10, which subtends the shaft and a plurality of ducts 13 subtending the bearing surface and a discharge port 17' for returning pressurized fluid to the supply. A conduit 71 in communication with the inlet port 39 and with the ducts 13 is disposed in the base and cap portion 3 and 5, respectively, to direct lubricating fluid through the ducts 13 to cool the bearing surface 10. Orifices 73 and 75 regulate the flow of lubricating fluid to provide the required quantity of lubricating fluid to the bearing surface 10 to produce the proper film thickness and to ducts 13 to maintain the optimum bearing surface temperature. The conduit 71 is disposed so that the flow of fluid through the ducts is in the same direction as the shaft rotates, clockwise.

Figure 5:
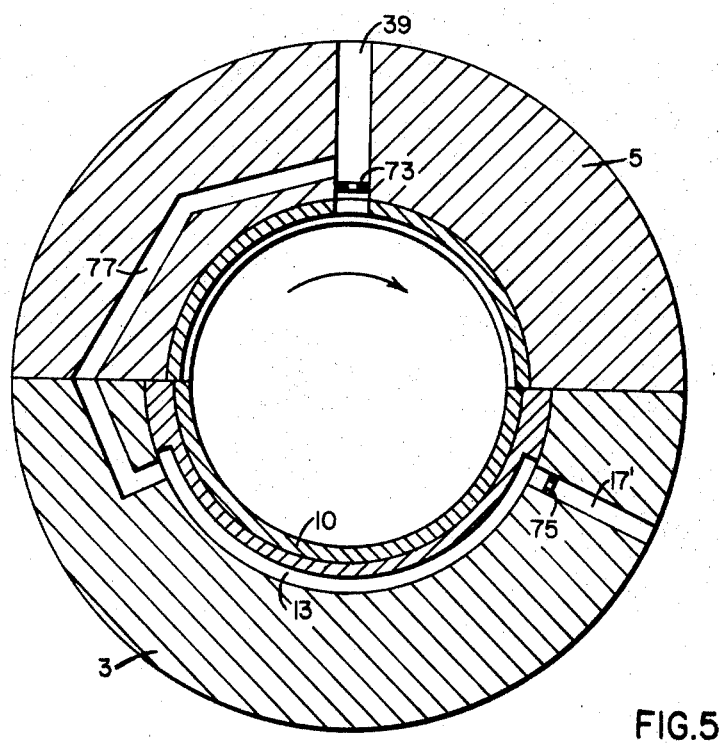
FIG. 5 is a sectional view showing another modification.

FIG. 5 shows a bearing similar to the bearing shown in FIG. 4 the only difference being that the conduit 77 is disposed to cause the fluid to flow through the ducts in a direction opposite the direction the shaft rotates to optimize the amount of heat removed from the bearing surface 10.

The journal bearings hereinbefore described can advantageously be made to have a small L/D ratio and take advantage of the low friction losses and greater stability of such bearings and still operate at a low temperature to provide an ideal journal bearing for large turbines.

What is claimed is:

1. A journal bearing, said bearing comprising a journal portion disposed on a shaft to be rotated, a base portion and a cap portion, said base portion having a bearing surface subtending said journal portion and a plurality of ducts subtending said bearing surface, said cap portion having means for supplying pressurized lubricating fluid to said bearing surface and to said ducts to support said journal portion on a wedge shaped film of said fluid and to cause said fluid to flow through said ducts and remove heat from said bearing surface, said means for supplying pressurized fluid comprising an inlet port in communication with the supply of pressurized fluid and a groove in the cap portion, the groove being disposed to cooperate with the inlet port and the journal portion to form a pump which is adapted to increase the pressure of the fluid flowing from the inlet port to the ducts to increase the velocity of fluid flowing through the ducts, thereby removing additional heat from the bearing surface.

2. A journal bearing as set forth in claim 1, wherein the groove has a cylindrical surface the axis of which is disposed in the cap portion thereof.

3. A journal bearing as set forth in claim 1, and further comprising an inlet slot disposed adjacent the leading edge of the bearing surface the slot being in communication with the groove and with the ducts.

4. A journal bearing as set forth in claim 3, wherein the leading edge of the bearing surface is beveled to assist in forming the supporting wedge of lubricating fluid, which supports the journal portion, when it rotates.

5. A journal bearing as set forth in claim 1, wherein the trailing edge of the bearing surface has an axial groove disposed therein forming a dam adapted to wipe lubricating fluid from the journal portion, said axial groove being in communication with the discharge port to allow the fluid wiped from the journal portion to be returned to the supply.

6. A journal bearing as set forth in claim 5, wherein the ducts are also in communication with the discharge port.

7. A journal bearing as set forth in claim 1, wherein the pressurized fluid flows through the duct in the same direction as the shaft rotates.

8. A journal bearing as set forth in claim 1, wherein the direction of flow of pressurized fluid is opposite the direction of shaft rotation.

* * * * *